(12) United States Patent
Sip et al.

(10) Patent No.: US 8,067,921 B2
(45) Date of Patent: Nov. 29, 2011

(54) RECHARGING DEVICE AND RECHARGING SYSTEM USING SAME

(75) Inventors: Kim-Yeung Sip, Shenzhen (CN); Song-Ling Yang, Shenzhen (CN)

(73) Assignees: Hon Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 324 days.

(21) Appl. No.: 12/430,851

(22) Filed: Apr. 27, 2009

(65) Prior Publication Data

US 2010/0213894 A1    Aug. 26, 2010

(30) Foreign Application Priority Data

Feb. 20, 2009 (CN) .......................... 2009 1 0300488

(51) Int. Cl.
*H02J 7/00* (2006.01)
(52) U.S. Cl. ....................................... 320/108; 320/109

(58) Field of Classification Search .................. 320/108, 320/109
See application file for complete search history.

(56) References Cited

U.S. PATENT DOCUMENTS

| | | | | |
|---|---|---|---|---|
| 5,821,731 A | * | 10/1998 | Kuki et al. ..................... | 320/108 |
| 5,952,814 A | * | 9/1999 | Van Lerberghe ............. | 320/108 |
| 6,803,744 B1 | * | 10/2004 | Sabo ............................. | 320/108 |
| 2008/0252251 A1 | * | 10/2008 | Joasil ........................... | 320/101 |

* cited by examiner

*Primary Examiner* — Huy Q Phan
*Assistant Examiner* — Alesa Allgood
(74) *Attorney, Agent, or Firm* — Altis Law Group, Inc.

(57) ABSTRACT

A recharging system for wireless charging comprising an electronic device and a recharging device. The electronic device comprises a first electromagnetic induction device and a rechargeable battery. The recharging device comprises a detection layer, a second electromagnetic induction device, and a driving device. The detection layer is configured for detecting the position of the electronic device. The driving device drives the second electromagnetic induction device to align with the first electromagnetic induction device. The second electromagnetic induction device is configured for inducing a current in the first electromagnetic induction device.

8 Claims, 3 Drawing Sheets

RECHARGING DEVICE AND RECHARGING SYSTEM USING SAME

BACKGROUND

1. Technical Field

The present disclosure relates to recharging devices, and particularly, to an electromagnetic induction recharging device and recharging system using the same.

2. Description of Related Art

A portable electronic device, such as a cellular phone or a notebook is typically powered by a rechargeable battery. The connector for recharging the rechargeable battery is usually on the housing of the portable electronic device so that the contact terminal, of the connector, can be electrically connected to a charging terminal of a recharging device. However, the contact terminal may be easily contaminated by impurities and also easily worn away due to frictions between the contact terminal and charging terminals.

What is needed, therefore, is a recharging device and recharging system using the same which can overcome the above-described problems.

DETAILED DESCRIPTION

Embodiments of the present disclosure will now be described in detail below, with reference to the accompanying drawings.

Figure 1:
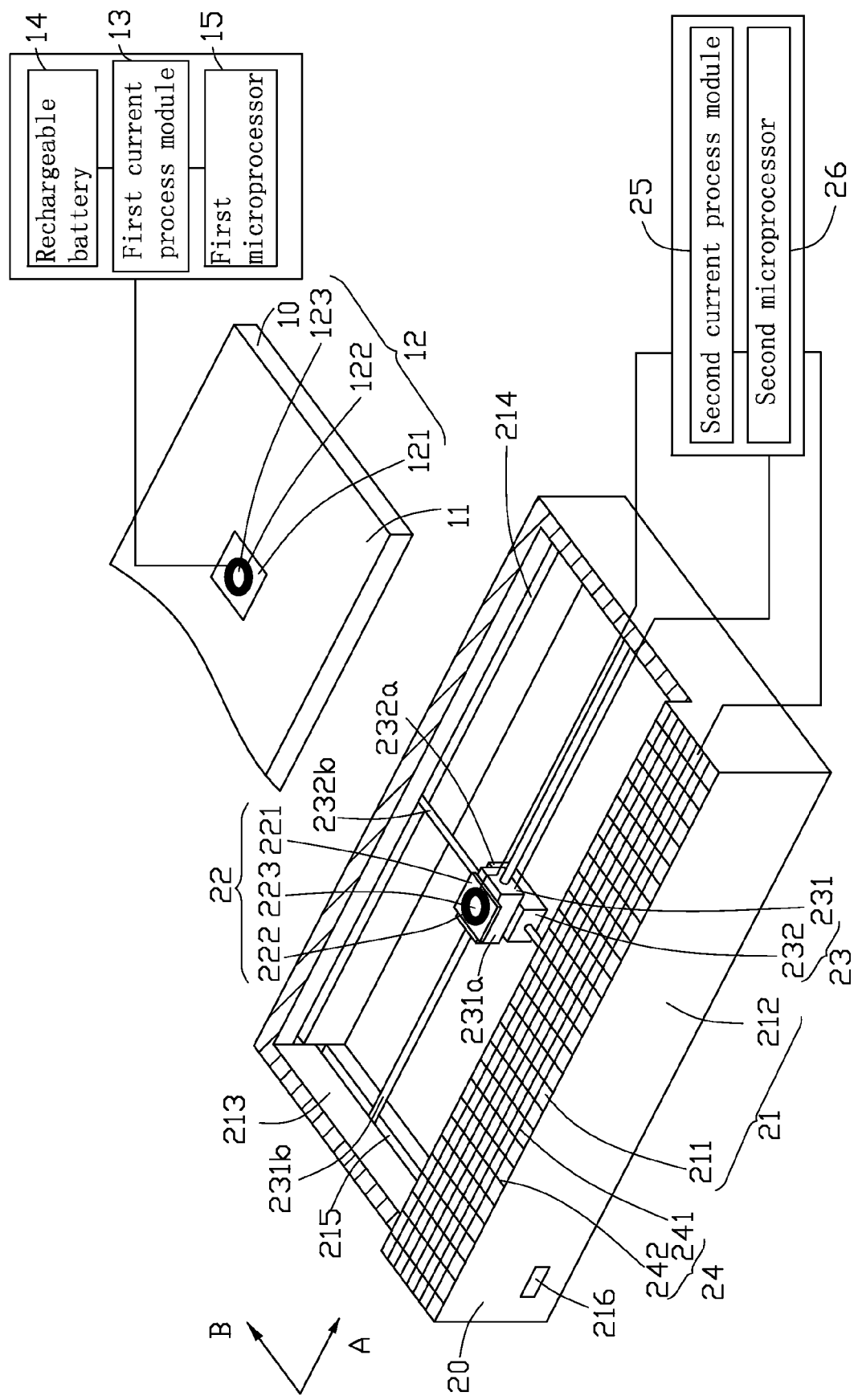
FIG. 1 is a partially sectioned, schematic view of a recharging system according to the present disclosure.
Figure 2:
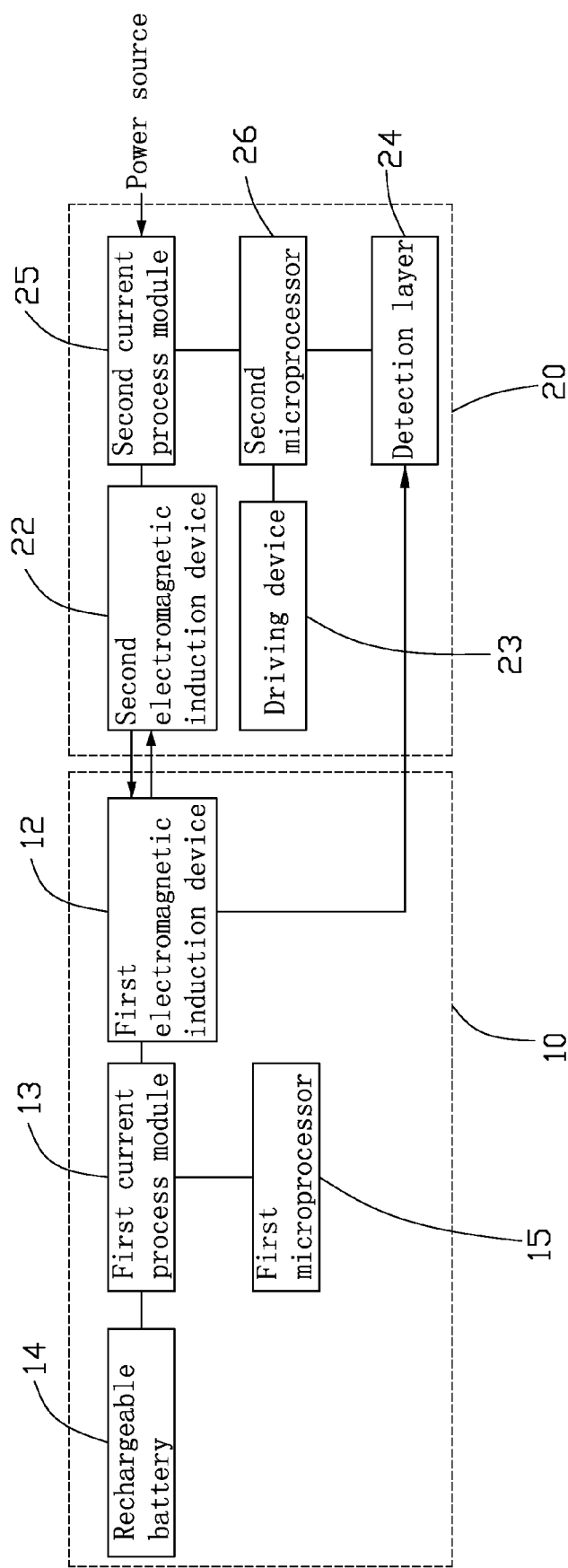
FIG. 2 is a function block diagram of a recharging system included a detection layer.

Referring to FIGS. 1-2, a recharging system according to an exemplary embodiment, includes an electronic device 10 and a recharging device 20. The recharging device 20 is used for recharging the electronic device 10. The electronic device 10 can be a mobile phone, a computer, or a digital camera etc. In the present embodiment, the electronic device 10 is a mobile phone.

The electronic device 10 includes a shell 11, a first electromagnetic induction device 12, a first current process module 13, a rechargeable battery 14, and a first microprocessor 15. The shell 11 is configured for housing the first electromagnetic induction device 12, the first current process module 13, the rechargeable battery 14, and the first microprocessor 15. The first current process module 13 electrically connects the first electromagnetic induction device 12 and the rechargeable battery 14. The first microprocessor 15 electrically connects with the first current process module 13.

The first electromagnetic induction device 12 is disposed on the shell 11, and includes a first base 121, a first coil 122, and a first core 123. The first base 121 is made of electrical insulating material, such as plastic, wood, ceramic, and so on. The first coil 122 and the first core 123 are secured on the first base 121. The first core 123 is disposed inside the first coil 122 for improving electromagnetic induction efficiency of the first electromagnetic induction device 12.

The first current process module 13 is configured for converting alternating current generated by the first electromagnetic induction device 12 into direct current, or converting residual current of the rechargeable battery 14 into alternating current.

The first microprocessor 15 is configured for controlling the first current process module 13 to change the operation mode, i.e., converting alternating current into direct current or converting direct current into alternating current.

The recharging device 20 includes a casing 21, a second electromagnetic induction device 22, a driving device 23, a detection layer 24, a second current process module 25, and a second microprocessor 26. The second current process module 25 electrically connects with the second electromagnetic induction device 22, the second microprocessor 26, and a power source. The second microprocessor 26 electrically connects with the driving device 23 and the detection layer 24.

The casing 21 is configured for housing the second electromagnetic induction device 22, the driving device 23, the detection layer 24, the second current process module 25, and the second microprocessor 26. The casing 21 includes a loading plate 211 and four sidewalls 212. The sidewalls 212 perpendicularly extend downwards from the edge of the loading plate 211.

The sidewalls 212 includes an inner surface 213 defining a pair of first guide grooves 214 and a pair of second guide grooves 215. The first guide grooves 214 extend along the direction A of FIG. 1. The second guides grooves 215 extend along the direction B of FIG. 1. The sidewalls 212 further includes an electric socket 216, the electric socket 216 is configured for electrically connecting to the power source.

The second electromagnetic induction device 22 is disposed on the driving device 23, and includes a second base 221, a second coil 222, and a second core 223. The second base 221 is made of electrical insulating material, such as plastic, wood, ceramic, and so on. The second coil 222 and the second core 223 are secured on the second base 221. The second core 223 is disposed inside the second coil 222 for improving electromagnetic induction efficiency of the second electromagnetic induction device 22.

The driving device 23 includes a first motor 231 and a second motor 232. The first motor 231 includes a first controller 231a and a first shaft 231b. The first shaft 231b is rotatably disposed in the first controller 231a, and the first controller 231a can move along the first shaft 231b. The second motor 232 includes a second controller 232a and a second shaft 232b. The second shaft 232b is rotatably disposed in the second controller 232a, and the second controller 232a can move along the second shaft 232b. The first controller 231a is fixed on the second controller 232a. Two ends of the first shaft 231b are slidably latched in the second guide grooves 215. Two ends of the second shaft 232b are slidably latched in the first guide grooves 214.

Figure 3:
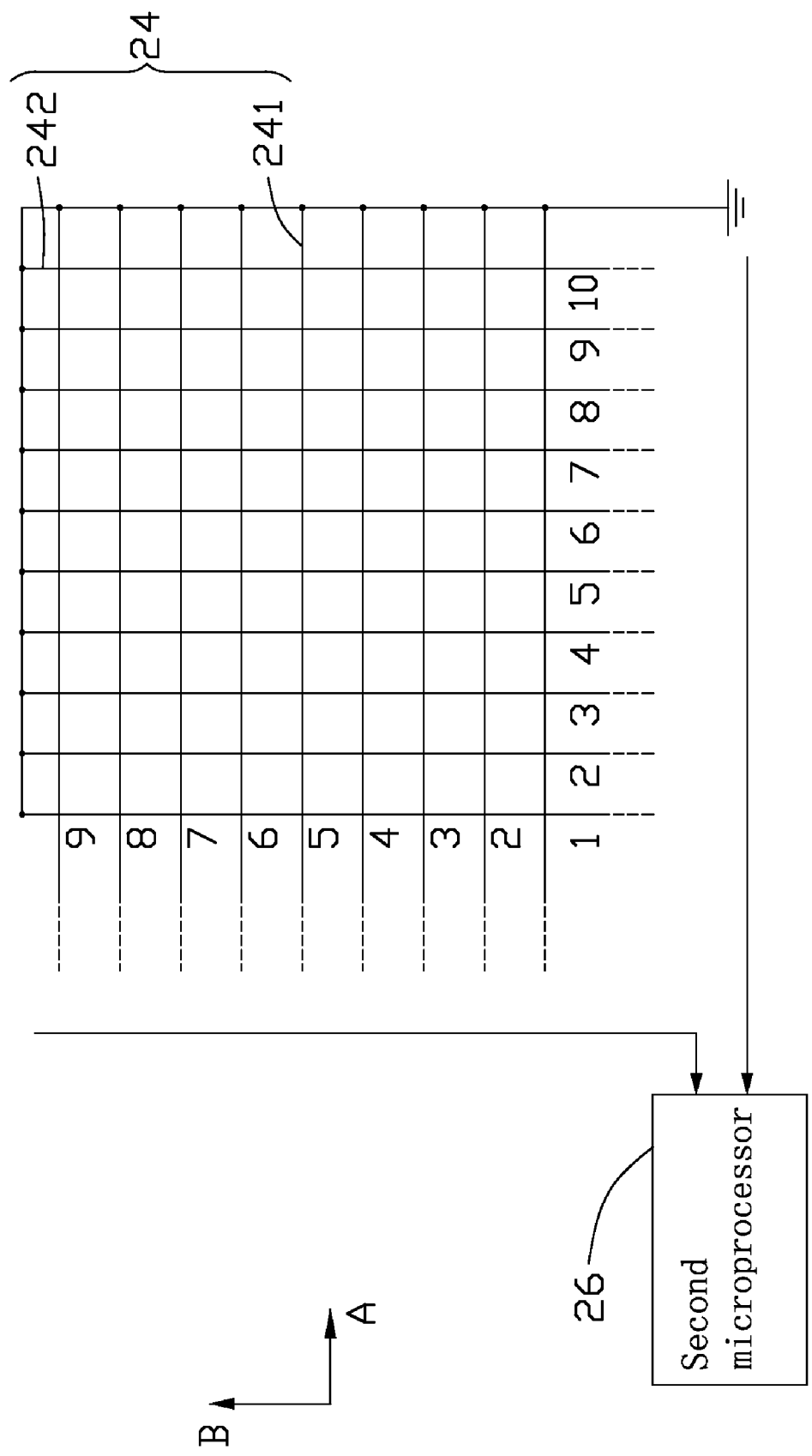
FIG. 3 is a schematic view of the detection layer of a recharging system.

Referring to FIG. 1 and FIG. 3, the detection layer 24 is configured for detecting the position of the electronic device 10. The detection layer 24 is disposed on the loading plate 211. The detection layer 24 is a grid of wires including a first layer 241 of wires and a second layer 242 of wires running perpendicular to each other. The first layer 241 is insulated from the second layer 242. The wires of the first layer 241 are arranged in the direction A and the wires of the second layer 242 are arranged in the direction B. The wires are grounded at one end, another end of the wires is coupled to the second microprocessor 26.

The second current process module 25 is configured for modulating the current of the power source and the detected current of the second electromagnetic induction device 22.

The second microprocessor 26 is configured for controlling the driving device 23 to move.

Referring to FIGS. 1-2, initially, the second electromagnetic induction device 22 of the recharging device 20 is located at the middle of the casing 21. To recharge the rechargeable battery 14 of the electronic device 10, the electronic device 10 is changed to the recharging mode, and placed on the loading plate 211 by the user. In the recharging mode, the remanent voltage of the battery produces a residual direct current. The first microprocessor 15 controls the first current process module 13 to convert the residual direct current of the rechargeable battery 14 into alternating current. The alternating current is inputted to the first electromagnetic induction device 12 thereby inducing a current to flow in the first layer 241 and a current to flow in the second layer 242 of the detection layer 24. The second microprocessor 26 computes the position of the first electromagnetic induction device 12 based on the current flowing through the wires, along the directions A and B. The second microprocessor 26 then moves the first motor 231 along the direction A, and the second motor 232 along the direction B. When the first controller 231a of the first motor 231 moves along the first shaft 231b, the second shaft 232b of the second motor 232 slides along the first guide grooves 214. When the second controller 232a of the second motor 232 moves along the second shaft 232b, the first shaft 231b of the first motor 231 slides along the second guide grooves 215.

When the first electromagnetic induction device 12 is aligned with the second electromagnetic induction device 22, the first current process module 13 turn off the residual current of the rechargeable battery 14. An alternating current is applied to the second electromagnetic induction device 22 and this induces an alternating current in the first electromagnetic induction device 12. The first electromagnetic induction device 12 outputs the induced alternating current to the first current process module 13. The first microprocessor 15 controls the first current process module 13 to convert the induced alternating current to direct current. The direct current flows to the rechargeable battery 14 thereby recharging the rechargeable battery 14.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A recharging system, comprising:
    an electronic device comprising:
        a first electromagnetic induction device; and
        a rechargeable battery;
    a recharging device comprising:
        a casing comprising a loading plate and four side walls, the side walls vertically disposed on the fringe of the loading plate, the loading plate being configured for loading the electronic device;
        a detection layer configured for detecting the position of the electronic device according to electromagnetic wave generated by the first electromagnetic induction device, the detection layer comprising a first layer and a second layer, the first layer and the second layer being a grid of wires and running perpendicular to each other, when the electronic device being loaded on the loading plate, the electromagnetic wave generated by the first electromagnetic induction device inducing a current to flow within the first layer and a current to flow in the second layer;
        a second microprocessor configured for computing the position of the first electromagnetic induction device based on the current flowing through the wires;
        a second electromagnetic induction device; and
        a driving device comprising a first motor and a second motor, the first motor and the second motor slidably latched in the side walls, and being controlled by the second microprocessor to drive the second electromagnetic induction device to align with the first electromagnetic induction device according to the position of the first electromagnetic induction device.

2. The recharging system as claimed in claim 1, wherein the electronic device further comprises a first current process module configured for converting a direct current generated by the rechargeable battery into an alternating current and converting alternating current generated by the first electromagnetic induction device into direct current.

3. The recharging system as claimed in claim 2, wherein the electronic device further comprises a first microprocessor configured for controlling the first current process module to change operation modes between an operation mode of converting a direct current generated by the rechargeable battery into an alternating current and converting alternating current generated by the first electromagnetic induction device into direct current.

4. The recharging system as claimed in claim 1, wherein the recharging device further comprises a second current process module configured for modulating the current of a power source and the current of the second electromagnetic induction device.

5. The recharging system as claimed in claim 1, wherein the side walls comprises an inner surface defining a pair of first guide grooves and a pair of second guide grooves; the first motor comprises a first controller and a first shaft, the second motor comprises a second controller and a second shaft; the first shaft is slidably latched in the second guide grooves, and the second shaft is slidably latched in the first guide grooves.

6. A recharging device, comprising:
    a casing comprising a loading plate and four side walls, the side walls vertically disposed on the fringe of the loading plate, the loading plate being configured for loading an electronic device;
    a detection layer configured for detecting the position of the electronic device using electromagnetic wave generated by the electronic device, the detection layer comprising a first layer and a second layer, the first layer and the second layer being a grid of wires and running perpendicular to each other, when the electronic device being loaded on the loading plate, the electromagnetic wave generated by a first electromagnetic induction device of the electronic device inducing a current to flow within the first layer and a current to flow in the second layer;
    a second microprocessor configured for computing the position of the first electromagnetic induction device of the electronic device based on the current flowing through the wires;
    a second electromagnetic induction device; and
    a driving device comprising a first motor and a second motor, the first motor and the second motor slidably latched in the side walls, and being controlled by the second microprocessor to drive the second electromagnetic induction device to align with the first electromagnetic induction device according to the position of the first electromagnetic induction device.

7. The recharging device as claimed in claim 6, wherein the recharging device further comprises a second current process module configured for modulating the current of a power source and the current of the second electromagnetic induction device.

8. The recharging device as claimed in claim 6, wherein the side walls comprise an inner surface defining a pair of first guide grooves and a pair of second guide grooves; the first motor comprises a first controller and a first shaft, the second motor comprises a second controller and a second shaft; the first shaft is slidably latched in the second guide grooves, and the second shaft is slidably latched in the first guide grooves.

* * * * *